Figure 1:
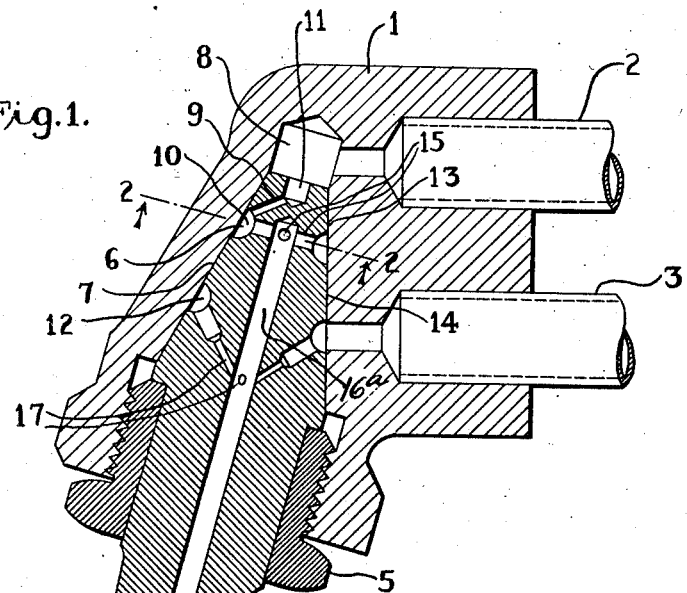

Sept. 8, 1925.

F. J. NAPOLITAN

TORCH

Original Filed June 26, 1919

1,553,000

INVENTOR
F. J. Napolitan
BY
ATTORNEY

Patented Sept. 8, 1925.

1,553,000

UNITED STATES PATENT OFFICE.

FRANCIS JOHN NAPOLITAN, OF SPRINGFIELD, MASSACHUSETTS, ASSIGNOR, BY MESNE ASSIGNMENTS, TO AIR REDUCTION COMPANY, INCORPORATED, OF NEW YORK, N. Y., A CORPORATION OF NEW YORK.

TORCH.

Application filed June 26, 1919, Serial No. 306,826. Renewed December 17, 1921. Serial No. 523,246.

*To all whom it may concern:*

Be it known that I, FRANCIS JOHN NAPOLITAN, a citizen of the United States, and resident of Springfield, in the county of Hampden and State of Massachusetts, have invented a new and useful Torch, of which the following is a specification.

The invention relates to oxy-acetylene or like torches for welding and cutting metals, wherein the gases are brought together in interchangeable removable parts or tips which interpose a seal between the gases so that they cannot mingle before entering the tip, and particularly to torches of this kind wherein the oxygen is supplied at materially higher pressure than the acetylene, as is important for safety. The object is to provide an efficient interchangeable, removable tip or mixer of a construction adapted to prevent flashbacks.

Figure 2:
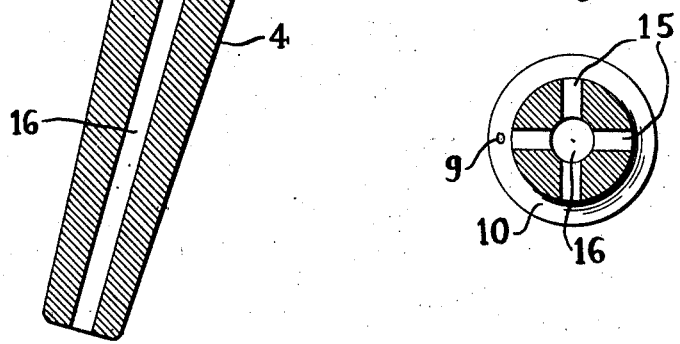

In the drawings forming a part hereof:

Fig. 1 is a section taken in an axial plane through the head and tip of a torch embodying the invention, the adjacent portions of the gas pipe conduits being in elevation; and Fig. 2 is a cross-section through the tip on the line 2—2 of Fig. 1.

The body of the torch or blowpipe is represented by the head 1 and the forward ends of the oxygen and acetylene pipes 2, 3 forming part of the usual handle or stock. The particular form of these parts of the torch may, of course, be varied.

A removable tip 4 is held tightly in the head by a nut 5, the construction being of the form comprising a conical socket 6 in the head and a conical seating portion 7 at the rear part of the tip. For each torch body there will be a plurality of tips or mixing devices, formed so as to be interchangeable with each other in sealing engagement with the head and having their ports and passages differently proportioned for different kinds and grades of work.

The oxygen, under substantially higher pressure than the acetylene, is supplied through the conduit 2 and enters a cavity 8 at the rear end of the socket, behind the end of the truncated cone of the tip. From here it passes through a restricted diagonal drill opening 9 constituting a proportioning port leading from the rear center point of the tip to a circumferential groove 10, preferably formed in the tip, which is isolated on the one hand from the relatively high pressure regions 2, 8 in the body of the torch, and on the other hand from the acetylene supply spaces 3, 12, by the sealing zones 13 and 14, respectively. For convenience of manufacture, a blind bore 11 of short and broad dimensions is made axially in the rear extremity of the tip, and the restricted port 9 extends from it.

From the groove 10 the oxygen finds unobstructed entrance to the interior of the tip through wide transverse bores 15, opening at right angles into a broad longitudinal center bore or main port 16, which extends from a point near the rear end of the tip to the discharge end thereof. The rear end of this bore is closed, except for the indirect communication by way of the passages 9, 10, 15 with the high pressure oxygen space.

The acetylene, under positive pressure lower than oxygen, enters the main bore at a point substantially beyond the oxygen entrance, through diagonal, forwardly inclined ports 17 drilled from the annular channel or distributing chamber 12. These ports, like the oxygen port 9, are proportioning elements and are designed with reference to the acetylene supply pressure and the other factors, so as to pass the requisite quantity of acetylene to join with the oxygen. For convenience the outer parts of these ports are drilled of large diameter, their smaller, inner portions constituting the acetylene metering ports proper.

The rearward extension $16^a$ of the main bore 16, between the acetylene inlets and the oxygen entrance, constitutes an elongated oxygen leading port or passage in line with the mixing chamber, the oxygen passage being much larger than the oxygen proportioning port 9 and preferably of the same or nearly the same area as the relatively broad mixing chamber. The oxygen jet driven under high pressure through the fine port 9 expands in the expansion space afforded by the chamber or chambers comprising the groove 10, the ample cross-bores 15 and the oxygen leading passage $16^a$, wherein the oxygen, now of reduced pressure and velocity, is conducted as a column to the point of arrival of the lateral, inclined acetylene streams.

While the preferred embodiment of the invention has been described in detail I do not wish to limit myself only to this form, as various changes and modifications may be made. A construction involving an elongated rearward extension of the main bore behind the acetylene inlet to form a broad oxygen leading port supplied by the restricted oxygen proportioning port at its rear end, with preferably an enlargement of such extension intermediate the oxygen and acetylene inlets and near the oxygen inlet, has been found to have an important influence in preventing or reducing flashing back. A very effective enlargement can be produced in a simple manner as shown herein by an ample transverse bore or bores intersecting the rear extension of the main port or bore and placing the same in communication with the groove 10, which is customarily provided in any event in the conical seats of such tips. By conducting the restricted oxygen inlet port to one side or out of line so that the oxygen stream is baffled important results are also secured.

What I claim as new is:

1. A torch comprising a body with supply passages for the two kinds of gases, and an interchangeable removable mixing part having sealing contact with the body, and formed with a longitudinal main port in the removable part closed off at the rear end, a restricted oxygen port having its inlet at the rear extremity of the part and leading to one side, an annular passage into which said port delivers, transverse ports in the removable part for admitting the oxygen from said annular passage into the rear portion of the longitudinal main port, and lateral inlet ports for the other kind of gas opening farther along into the main port.

2. In a torch having a body with supply passages for the two kinds of gases, an interchangeable removable mixing part formed for sealing contact with the body and having a longitudinal main port closed off at the rear end, lateral inlets thereto for one kind of gas, a diagonal port leading from its rear extremity to one side for controlling the flow of the other kind of gas, and inlet ports for said other kind of gas opening inward from the side into the main port rearwardly of said other lateral inlets.

3. An interchangeable mixing part for torches formed for sealing contact with the body and having a longitudinal main port closed off at the rear end, lateral inlets thereto for one kind of gas, a port for the other kind of gas having its inlet at the rear extremity of the part and passing laterally out of direct communication with the main port, an external chamber receiving the gas from said port, and an inlet from said chamber opening into the main port rearwardly of said other lateral inlets.

4. A torch tip of the interchangeable unit variety having a sealing rear portion, a longitudinal main port closed off at the rear end, lateral inlets thereto for one kind of gas, and an indirect passageway for the other kind of gas in the sealing portion of the tip comprising a port extending from the rear extremity laterally out of line with the main port and a transverse port or ports receiving the gas therefrom and intersecting the main port.

5. A torch tip having a sealing rear portion, a longitudinal main port closed off at the rear end, lateral inlets for one kind of gas opening into said main port in front of its rear end, an external chamber in said sealing portion, a transverse bore extending from said chamber into the side of the rear portion of the main bore, and a restricted proportioning inlet port for the other kind of gas having its entrance at the rear extremity of the tip and passing diagonally out of line with the main bore into communication with said external chamber and transverse bore.

6. In a torch, an interchangeable tip having a sealing rear portion, a longitudinal main port terminating at the rear end at a point in front of the rear extremity of the tip, lateral inlets for one kind of gas to said main port, an external chamber within the limits of the sealing portion, a transverse bore extending from said chamber into the side of the main port adjacent its rear end, and a restricted proportioning inlet port in the rear end of the tip for the other kind of gas.

7. A tip or mixing part for an oxyacetylene or like torch formed with a longitudinal main bore or port, a lateral inlet for the combustible gas opening into the main bore, the main bore having an elongated rearward extension forming a broad oxygen leading port, a restricted proportioning inlet for the oxygen in communication with said oxygen leading port, and an enlarged oxygen expansion chamber adjacent the oxygen proportioning port.

8. A tip or mixing part for an oxyacetylene or like torch, formed with a longitudinal main port constituting a mixing chamber, a lateral inlet for the combustible gas opening into said mixing chamber, a broad oxygen leading port in line with the mixing chamber, a restricted proportioning inlet for the oxygen in communication with the oxygen leading port, and an ample transverse bore intersecting said broad oxygen leading port.

9. A tip or mixing part for an oxyacetylene or like torch formed with a longitudinal main port affording a mixing chamber, a lateral acetylene inlet to said main port, a broad oxygen leading port in line with the mixing chamber, a restricted oxygen inlet in communication with said leading port, and means for baffling the oxygen stream issuing from said restricted port.

10. An interchangeable mixing part for an oxyacetylene or like torch, having a sealing rear portion, a longitudinal main port affording a mixing chamber, a lateral acetylene inlet to said main port, the main port having a rearward extension behind such inlet forming a broad oxygen leading port, a restricted oxygen inlet out of line with the main port, and an enlarged space in the rear part of the tip into which said restricted oxygen inlet delivers, the oxygen then passing by way of the broad leading port to the mixing chamber, where the oxygen column is joined by the combustible gas.

11. A torch structure containing a restricted proportioning inlet for the oxygen, an expansion chamber, an inlet for the combustible gas, and a broad longitudinal oxygen leading port for conducting the oxygen received from said restricted inlet to the point of entrance of the combustible gas.

12. A torch structure containing a restricted proportioning inlet for the oxygen, means whereby the oxygen issuing from said port is baffled and expanded, an inlet for the combustible gas, and a broad longitudinal oxygen leading port for conducting the oxygen received from said restricted inlet to the point of entrance of the combustible gas.

FRANCIS JOHN NAPOLITAN.